United States Patent [19]
Gatten et al.
[11] Patent Number: 4,989,016
[45] Date of Patent: Jan. 29, 1991

[54] METHOD AND APPARATUS FOR TIME DISTRIBUTED USE OF INK-JETS IN A PRINTER-PLOTTER

[75] Inventors: Ronald A. Gatten, Pleasanton; Lawrence R. Joba, Santa Cruz, both of Calif.

[73] Assignee: Spectra-Physics, Inc., San Jose, Calif.

[21] Appl. No.: 348,842

[22] Filed: May 8, 1989

[51] Int. Cl.[5] .......... B41J 2/01; G01D 3/08
[52] U.S. Cl. .......... 346/1.1; 346/140 R; 400/17; 364/520
[58] Field of Search .......... 346/1.1, 140, 33 R; 400/17; 364/520, 518

[56] References Cited

U.S. PATENT DOCUMENTS 4,622,560 11/1986 Wilhelmus .......... 346/1.1
4,758,849 7/1988 Platt .......... 346/140

FOREIGN PATENT DOCUMENTS 156074 12/1980 Japan .
153665 9/1983 Japan .
156783 9/1984 Japan .
15169 1/1985 Japan .
129266 7/1985 Japan .

*Primary Examiner*—Joseph W. Hartary
*Attorney, Agent, or Firm*—Skjerven, Morrill, MacPherson, Franklin & Friel

[57] ABSTRACT

A computer program for controlling an ink-jet printer-plotter having a conventional multi-jet ink-jet cartridge operates so that when the printer-plotter is in plot mode, the jets are used in sequence, instead of conventionally always using the same jet. A different jet is used each time a new graph is started. This method lengthens the life of the cartridge by reducing stress on any one of the jets.

12 Claims, 10 Drawing Sheets

| | | | |
|---|---|---|---|
| FIG. 3A | FIG. 3B | FIG. 3C | FIG. 3D |

```
Spectra-Physics Autolab Model 4400 Integrator using ink-jet
printer plotter: Rotating Dot Selection
Copyright Spectra-Physics, 1989
;*********************************************************************
INCDOT:                     ;Select Next Dot Position
;Purpose: Increment Dot Count to plot with another dot next time
;Called by: DOCR
;Subroutines Called: none
;Input Variables: NEXT_DOT
;Changed Variables: ACC,NEXT_DOT
;*********************************************************************
        DEC     NEXT_DOT        ;Decrement NEXT_DOT
        MOV     A,NEXT_DOT      ;ACC = NEXT_DOT
        JNB     ACC.7,INCDO1    ;If ACC .lt. 0
        MOV     NEXT_DOT,#9     ;Then, Next Dot = 9
INCDO1:
        RET                     ;Return

;*********************************************************************
GETALD:                     ;[ACC] = ALDTABLE(ACC)
;Purpose:Get dot alignment from table for Print <-> Plot transition
;Called by: ALIGN_DOT
;Subroutines Called: none
;Input Variables: ACC
;Changed Variables: ACC
;*********************************************************************
        ANL     A,#15           ;And Off the Double Dot Bit
        INC     A
        MOVC    A,@A+PC
        RET
;*********************************************************************
ALDTABLE:
;Purpose: Dot alignment table for Print <-> Plot transition
;Used by: GETALD
;*********************************************************************
        DB      (11*VSTIN+48)/96 ;0     Dot 1
        DB      (10*VSTIN+48)/96 ;1     Dot 2
        DB      (9*VSTIN+48)/96  ;2     Dot 3
        DB      (8*VSTIN+48)/96  ;3     Dot 4
        DB      (7*VSTIN+48)/96  ;4     Dot 5
        DB      (6*VSTIN+48)/96  ;5     Dot 6
        DB      (5*VSTIN+48)/96  ;6     Dot 7
        DB      (4*VSTIN+48)/96  ;7     Dot 8
        DB      (3*VSTIN+48)/96  ;8     Dot 9
        DB      (2*VSTIN+48)/96  ;9     Dot 10
        DB      (1*VSTIN+48)/96 ;10     Dot 11
        DB      (0*VSTIN+48)/96 ;11     Dot 12
        DB      (14*VSTIN+48)/96) ;12   Plot line
```

Fig. 4A

Spectra-Physics Autolab Model 4400 Integrator using ink-jet printer plotter: Rotating Dot Selection

```
;*********************************************************************
DOT_ADJ:                            ;Adjust Dots Changing Plot <->
Print
;Purpose: Get adjustment for dot and script adjustment in DOT_SHIFT
;Called by: NEXTDATA
;Subroutines Called: ALIGN_DOT,SCRIPADJ
;Input Variables: NEXT_DOT,Flags(PLFLAG,PLOT_REQ)
;Changed Variables: DOT_SHIFT,Flags(NEXTPEN,FIRSTCR,
;                   PLFLAG)
;*********************************************************************
        MOV     DOT_SHIFT,#0        ;Dot Shift = 0
        MOV     C,PLFLAG            ;If PLOT_REQ .eq. PLFLAG
        JB      PLOT_REQ,DOTAD1     ;
        CPL     C
DOTAD1:
        JNC     DOTAD1A
        RET                         ;Then, Quit
DOTAD1A:
        MOV     A,#SCRIPOFF         ;Insert Sub or Super Script Offset
        JB      PLFLAG,DOTAD2       ;Else, If Dot Adjust For Plot
        CLR     NEXTPEN             ;Force Pen Off
        SETB    FIRSTCR             ;Set First Carriage Return Flag
        CPL     A                   ;Remove Sub or Super Script Offset
        INC     A
                                    ;Plotting
DOTAD2:
        CALL    SCRIPADJ            ;Add or Remove Sub/Super script
        MOV     DOT_SHIFT,A         ;Dot Shift = ACC
        MOV     B,NEXT_DOT          ;[B] = Plotting Dot Position
        MOV     A,#12               ;[ACC] = Printing Dot Ref
        JB      PLFLAG,DOTAD3       ;If Switching to Plot
        XCH     A,B                 ;Then ACC = Plot; B = Print
DOTAD3:
        CALL    ALIGN_DOT           ;Align the Dots
        CPL     PLFLAG              ;Complement Plot Flag
        JB      PLOT_REQ,DOTAD5     ;If Switching to Print Mode
        JBC     INCDFLAG,INCDOT     ;If Inc Dot Flag, Clear, Increment
                                    ;
DOTAD5:
        RET                         ;Else, Return
;*********************************************************************
ALIGN_DOT:                          ;Old Dot In B, New Dot In ACC
;Purpose: Add old dot - new dot position to DOT_SHIFT
;Called by: DOT_ADJ,TESTSUB
;Subroutines Called: GETALD(2)
;Input Variables: ACC,B,DOT_SHIFT
;Changed Variables: DOT_SHIFT
;*********************************************************************
        CALL    GETALD              ;ACC = ALDTABLE (ACC)
        XCH     A,B                 ;B = ALDTABLE (B)
        CALL    GETALD
        CLR     C                   ;ACC = Old Dot - New Dot
        SUBB    A,B
        ADD     A,DOT_SHIFT         ;Dot Shift = Dot Shift + ACC
        MOV     DOT_SHIFT,A
ALDOT1:
        RET                         ;Return
```

Fig. 4B

Spectra-Physics Autolab Model 4400 Integrator using ink-jet printer plotter: Rotating Dot Selection

```
;*****************************************************************
BLSUB:
;Purpose: Adjust X Position By ACC
;         Move platen motor the number of steps in the
;     Accumulator without changing the position count.
;Called by: BACKLASH
;Subroutines Called: SETMOTION,WAIT(2)
;Input Variables: ACC,XTARG,NXDIR-Flag
;Changed Variables: XPOS,RAMP,STEPTIME,Flags(XDIR,PEN,FASTAX,
;                   XLOWCUR,XMEDCUR,XHIGHCUR,XMOTION,XBACKFL
;*****************************************************************
        JZ      BLSUB2          ;If ACC .ne. 0, Then Do
        CALL    LOOKEQTARG      ;Set Look Aheads to Targets
        SETB    SETLOOK         ;Schedule Look Ahead in SETUP
        CALL    WAIT            ;Wait Until Target Reached
        MOV     C,ACC.7         ;Carry = .not. Sign Of ACC
        CPL     C
        MOV     XDIR,C          ;X Direction = - Sign Of ACC
        MOV     B,#0            ;BA = ACC
        JC      BLSUB1
        DEC     B
BLSUB1:
        ADD     A,XTARG+1       ;AB Position = XTARG + BA
        XCH     A,B
        ADDC    A,XTARG
        MOV     XPOS,A          ;X Position = AB
        MOV     XPOS+1,B
        SETB    FASTAX          ;Fast Axis = X
        SETB    XLOWCUR         ;Set X Low Current Flag
        SETB    XMEDCUR         ;Set X Medium Current Flag
        SETB    XMOTION         ;Turn On X Motion Flag
        SETB    XBUSY           ;Turn On X Busy Flag
        MOV     RAMPLIM,#XMINRL ;Ramp Limit = X Minimum Limit
        SETB    XBACKFL         ;Set X Backlash Flag
        CALL    SETMOTION       ;Start Motion
        CALL    WAIT            ;Wait Until Target Reached
BLSUB2:
        RET                     ;And Return
```

Fig. 4C

Spectra-Physics Autolab Model 4400 Integrator using ink-jet printer plotter: Rotating Dot Selection

```
;************************************************************************
BACKLASH:                          ;
V2.6T|
;Purpose: Adjust X Position For Backlash When Reversing Direction
;           If DOT_SHIFT is non-zero, then save next X direction
;       the stack.  Set next X direction equal to the sign of
;       DOT_SHIFT, if this is a change in X direction then call
;       ADDBACK to add or subtract backlash.  Call BLSUB to update
;       the X direction and move the platen the Dot Shift + backlash
;       distance without changing the position count.  Restore the
;       original Next X Direction.
;           If there is a change in X direction then call ADDBACK
;       to add or subtract backlash.  Call BLSUB to update the
;       X direction and move the platen the backlash distance
;       without changing the position count.
;           Steps taken in BACKLASH are not indicated as a change
;       in the X position.
;Called by: GONOW
;Subroutines Called: WAIT(2),DCHANGE(2),ADDBACK(2),BLSUB(2)
;Input Variables: DOT_SHIFT,XDIR,NXDIR
;Changed Variables: DOT_SHIFT,XDIR-flag
;************************************************************************
        MOV     A,DOT_SHIFT         ;ACC = Dot Shift
        JZ      BACKL3              ;If Dot Shift .ne. 0
        CALL    WAIT                ;Then, Wait for Motion Stop
        MOV     C,ACC.7             ;If Sign of ACC
        JB      XDIR,BACKL1         ; Is Opposite X Direction
        CPL     C                   ;
BACKL1:                    ;
        JNC     BACKL2              ;
        MOV     C,ACC.7             ;Next X Dir = - Sign (Dot Shift)
        CPL     C                   ;
        MOV     XDIR,C              ;
        CALL    DCHANGE             ;If Change In X Direction
        MOV     DOUBLEBACK,C        ;Set Double Backlash Flag
        CALL    ADDBACK             ;ACC =  ACC - (X Dir * Backlash)
BACKL2:
        CALL    BLSUB               ;Adjust Position By ACC
        CLR     A                   ;ACC, Dot Shift = 0
        MOV     DOT_SHIFT,A         ;
BACKL3:
        CALL    DCHANGE             ;If Change in X Direction
        JNC     BACKL4              ;Then Do:
        CALL    WAIT                ;Wait for Motion to Stop
        CPL     XDIR                ;Complement X Direction
        CALL    ADDBACK             ;ACC= ACC-(X Dir * Backlash)
        CALL    BLSUB               ;Adjust Position By ACC
BACKL4:
        CLR     DOUBLEBACK          ;Clear Double Backlash Flag
        CLR     XBACKFL             ;Clear X Backlash Flag
        RET                         ;And Return
```

Fig. 4D

METHOD AND APPARATUS FOR TIME DISTRIBUTED USE OF INK-JETS IN A PRINTER-PLOTTER

BACKGROUND OF THE INVENTION

1. Field of the Invention

This invention relates to ink-jet printer-plotters, and to a method and device for extending the life of the ink-jet cartridges used in such printer-plotters.

2. Description of the Prior Art

Ink-jet printers, one type being thermal ink-jet printers, are well known in the art, and are commonly used as output devices for printing text and plotting charts in conjunction with personal computers and scientific instruments. Such printers are therefore sometimes called "printer-plotters". Ink-jet printers are made by several companies. Hewlett Packard's family of portable "ThinkJet" ® ink-jet printers is a well known example. Thermal ink-jet printing uses thermal excitation (i.e., heat) to fire (i.e., eject) drops (also sometimes called dots) of ink through tiny orifices (i.e., nozzles or jets) in order to print text or graphics such as charts.

A key component of an ink-jet printer is the ink-jet cartridge. The Hewlett Packard thermal ink-jet cartridge is one well known type. It is a disposable unit 20 (see FIG. 1) which contains both ink supply and ink ejection means. The cartridge 20 consists of a liquid ink supply in a bladder 21, twelve ink-ejecting nozzles (i.e., jets) *22a*, *22b*, etc., and twelve corresponding thin film resistors (not shown) for applying ink selectively to the nozzles. The resistors are located directly below each jet *22a*, *22b*, etc. An ink-drop ejection process begins by heating the resistor of a selected ink-jet with a short electrical pulse. Within a few microseconds, the ink above the resistor is vaporized. The vapor bubble grows rapidly and imparts momentum to nonvaporized ink above the bubble. Some of this nonvaporized ink is ejected through the jet orifice *22a* at velocities exceeding ten meters per second. The jet *22a* is then automatically refilled with ink by capillary action.

The ink supply is contained in a synthetic rubber bladder 21 located immediately behind a printhead substrate 23. The bladder 21 is designed to maintain a relatively constant back pressure at the jets *22a*, *22b*, *22c*, etc. which is high enough to refill the jets after firing but low enough so ink is only expelled when desired.

The cartridge 20 also includes locating pins 24, cover 25, resistor array electrical contacts *26a*, *26b*, etc., and body 27.

Printers using cartridges of this type are typically controlled by a computer program installed in ROM (Read Only Memory) of a microcontroller in the printer. This computer program (i.e., software) conventionally accepts information from a host computer of scientific instrument and controls the printing of text or plotting of graphic images by the printer.

When conventionally used for plotting graphs, charts, etc., in scientific, industrial, and similar applications, the printer is operated in "plot mode" and in this plot mode only one of the twelve jets is used.

This heavy use of one jet in plot mode puts a disproportionate amount of "stress" on that one jet. Such stressing of one jet can result in higher failure rates of the cartridge. It is believed that there is more than one failure mechanism at work in what is termed "stress". First, there is the cycling of the resistor associated with the one jet used in plot mode which vaporizes the ink.

The thermal cycling provides a higher than desired failure rate due to fractures in the resistor which can occur by way of the thermal expansion and contraction of the resistor.

Second, there is a mechanism described in the *Hewlett-Packard Journal* of May 1985 (page 32) as "kogation". Kogation is "the plaque buildup found on the resistors of a thermal ink-jet head after several firings of the system. It can cause the head to fail by insulating the resistor from the ink supply, which reduces bubble generation. The major source of kogation is the ink. By modifying the ink material appropriately, kogation can be varied from rapid buildup to excessive erosion. In the ThinkJet ink, formulas have been optimized to provide a very slow buildup of plaque."

Thus the prior art method of plotting tends to cause failure of the one jet used for plotting, due to thermal cycling and kogation on that one jet. This failure of one jet renders the entire cartridge useless for printing or plotting well before all the ink in the cartridge has been used. Thus the prior art method of plotting causes cartridge failure resulting in extra expense and possible loss of valuable plot data due to cartridge failure.

SUMMARY OF THE INVENTION

In accordance with the present invention, the computer program for controlling an ink-jet printer includes the capability, when the printer is in plot mode and so is printing from only one jet at a time, to alternate jets (preferably sequentially) upon the occurrence of a predetermined event. Preferably that event is the completion of plotting of the current graph, but the event could be another occurrence such as completion of a line of print.

In the preferred embodiment, where the printer-plotter prints by means of a commercially available ink-jet cartridge having twelve jets, ten of which are commonly used for printing ten-dot high characters, only those ten jets are included in the sequence of changing jets.

The present invention thus distributes the stress of plotting over several of the jets, largely eliminating the problem of cartridge failure due to stress.

The preferred embodiment of the present invention is implemented in a printer-plotter using the Hewlett-Packard ink-jet cartridge. The printer-plotter uses software and a printer mechanism which, while in most respects conventional, are not identical to those in the Hewlett-Packard ThinkJet printer.

BRIEF DESCRIPTION OF THE DRAWINGS

FIGS. 4A to 4E show the sequential pages of a computer program as used in one embodiment of the present invention.

DETAILED DESCRIPTION OF THE INVENTION

Figure 2:
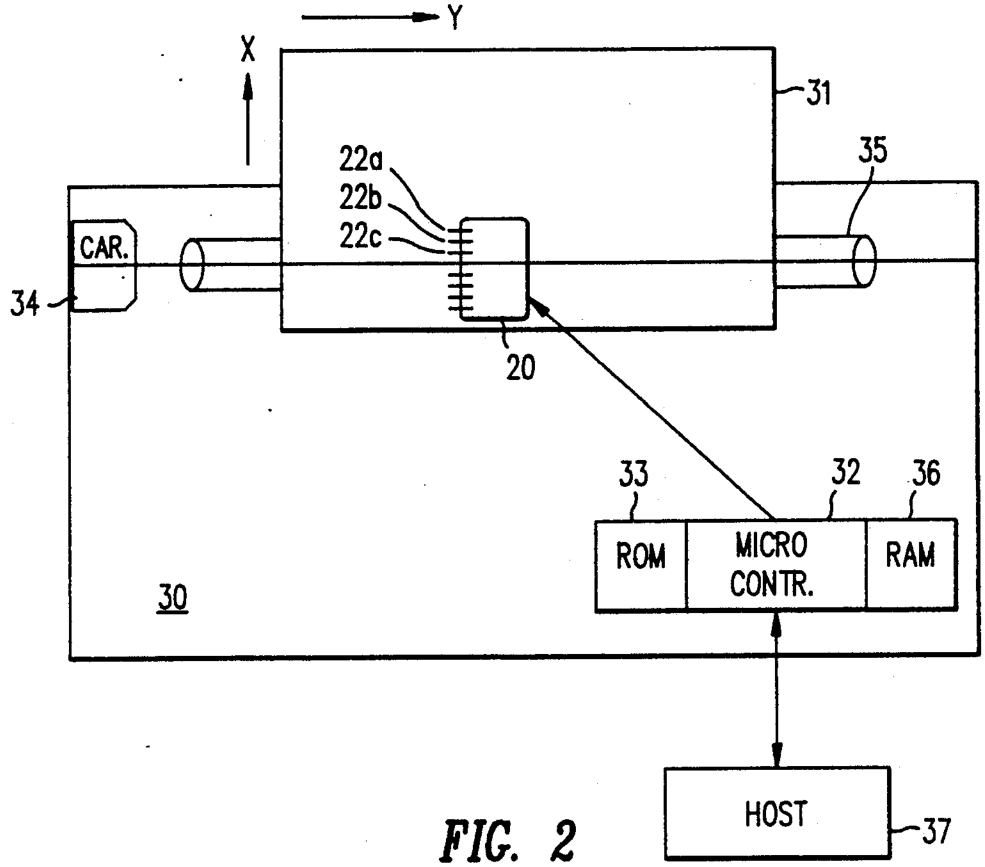
FIG. 2 shows a printer-plotter and host computer system consistent with the present invention.

In accordance with the present invention (see FIG. 2), a conventional printer-plotter 30 includes a conventional ink-jet cartridge 20 and is controlled by a microcontroller 32 preferably of the commercially available (such as from Intel) eight-bit 8052 type. Printer-plotter 30 prints and plots on medium 31 (such as paper). Medium 31 is conventionally movable in direction X (perpendicular to normal printing direction Y) by means of a platen 35 which is part of printer-plotter 30. (In this example, "X" and "Y" are shown rotated 90° from their usual geometric orientations, because graphs are often printed in this rotated orientation.) Printer-plotter 30 prints the output of host computer system 37. Ink-jet cartridge 20 conventionally is movable in direction Y by carriage means 34.

When the printer-plotter 30 is used in plot mode (i.e., to draw graphs), in accordance with the invention one jet such as 22A in the cartridge 20 is preferably used continuously under control of a computer program (not shown) installed in ROM (Read Only Memory) 33 in the microcontroller 32 until the graph is complete. When the next graph is initiated, a different jet such as **22*b* is used, and similarly, when the second graph is completed and another initiated, a third jet such as 22C** is used. A graph (or graphic image) is typically one chart, or one picture. In other embodiments, the jets may be rotated more or less frequently such as at each line, half-line, after two graphs, or after a certain elapsed plotting time.

Figure 1:
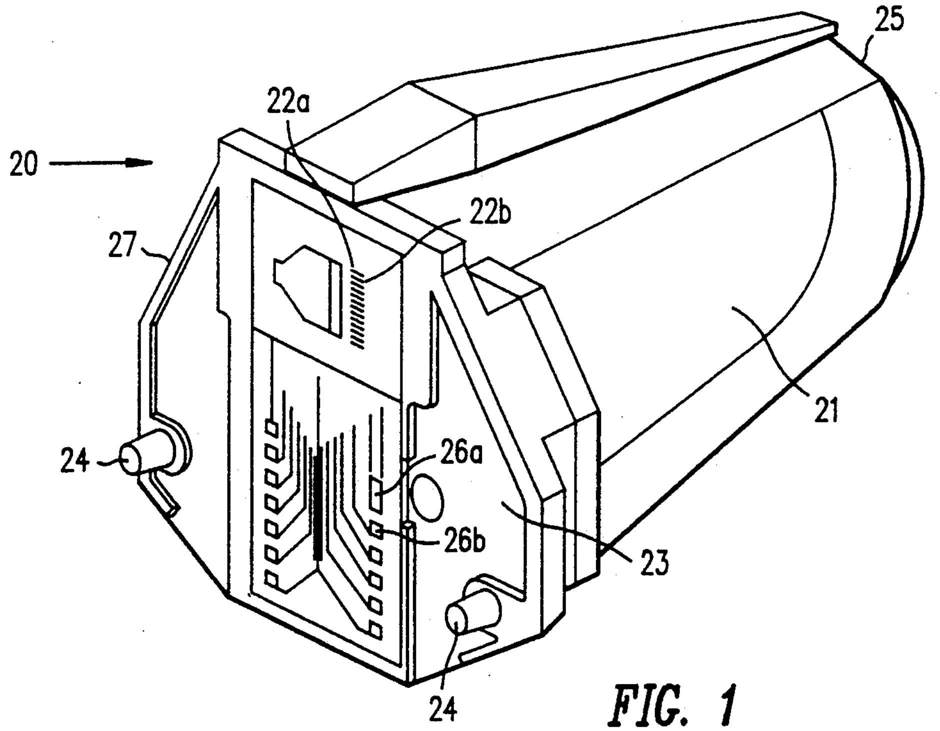
FIG. 1 shows an ink-jet cartridge consistent with both the prior art and the present invention.

In the preferred embodiment of the invention, this alternating or "rotation" of jets **22*a*, 22*b*, 22*c*, etc. continues through the tenth jet (not shown) whereupon the first jet 22*a* is used again. Although the conventional cartridge 20 has twelve jets 22*a*, 22*b*, etc., available, preferably only the first ten jets are used in the rotation. This is because the lower two jets (see FIG. 1**) are typically only rarely used when printing text using the most commonly used character fonts. If a particular jet has clogged or otherwise failed, it is desirable to be able to diagnose the failure by observation of printed characters which typically are printed after the plotting of each graph using the ten main jets. If one of the two lower jets had failed, the fact of the failure would not be obvious by observing the character text, because the letters would be well formed. Thus it is preferred in the present invention not to use these two lower jets at all for plotting.

In the preferred embodiment, information as to which jet was used to plot the graph last completed is stored in random access memory (RAM) 36 in the microcontroller 32. The information as to the last jet used is lost whenever the printer-plotter 30 is powered down in a conventional printer-plotter, and power must remain on (or nonvolatile memory provided) for the jets to be rotated for plotting of sequential graphs. Each time the printer-plotter 30 is powered up or the microcontroller 32 is reset, the rotation of jets preferably begins again with the same first jet **22*a***. In another embodiment, any of the jets may be the first jet.

The preferred embodiment of the present invention is described in more detail below with reference to FIG. 3, which depicts in a flowchart the computer program conventionally installed in microcontroller 32 which carries out the ink-jet rotation in accordance with the invention. The following is intended to explain the functioning of the computer program with reference to FIG. 3.

In accordance with the invention, the actual change of ink-jet being used for plotting takes place when printer-plotter 30 has completed printing character text and is about to begin plotting, i.e., is going into plot mode. This is so as not to lose track of the location in the X direction (i.e., an index position) relative to the medium of the particular ink-jet being used for plotting. In print mode when all ink-jets are in use, the index position is always the same, while this is not the case in plot mode where only one jet is used for any one plot.

Figures 3, 3A:
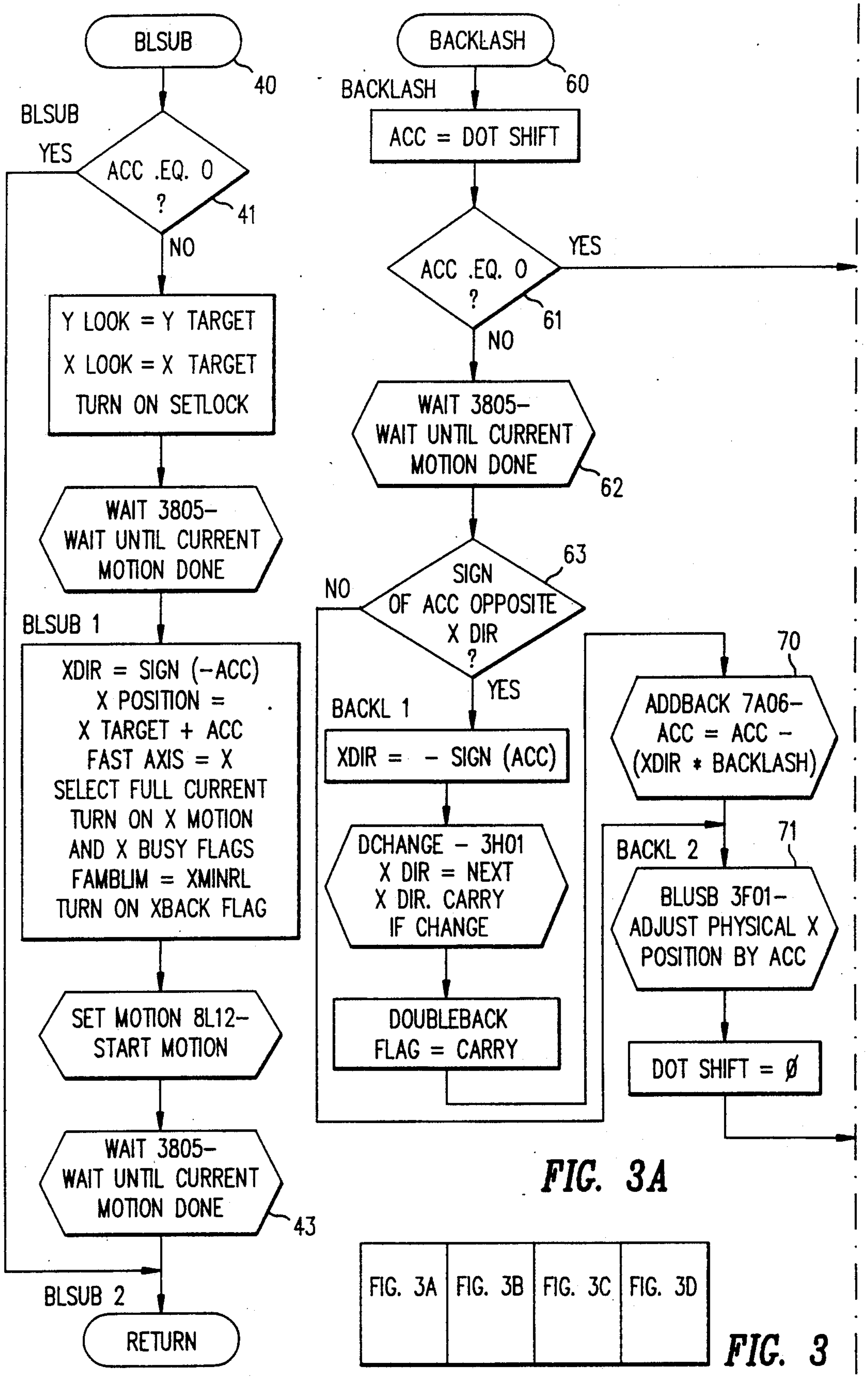
FIG. 3 shows a flowchart depicting one embodiment of the present invention.
Figure 3B:
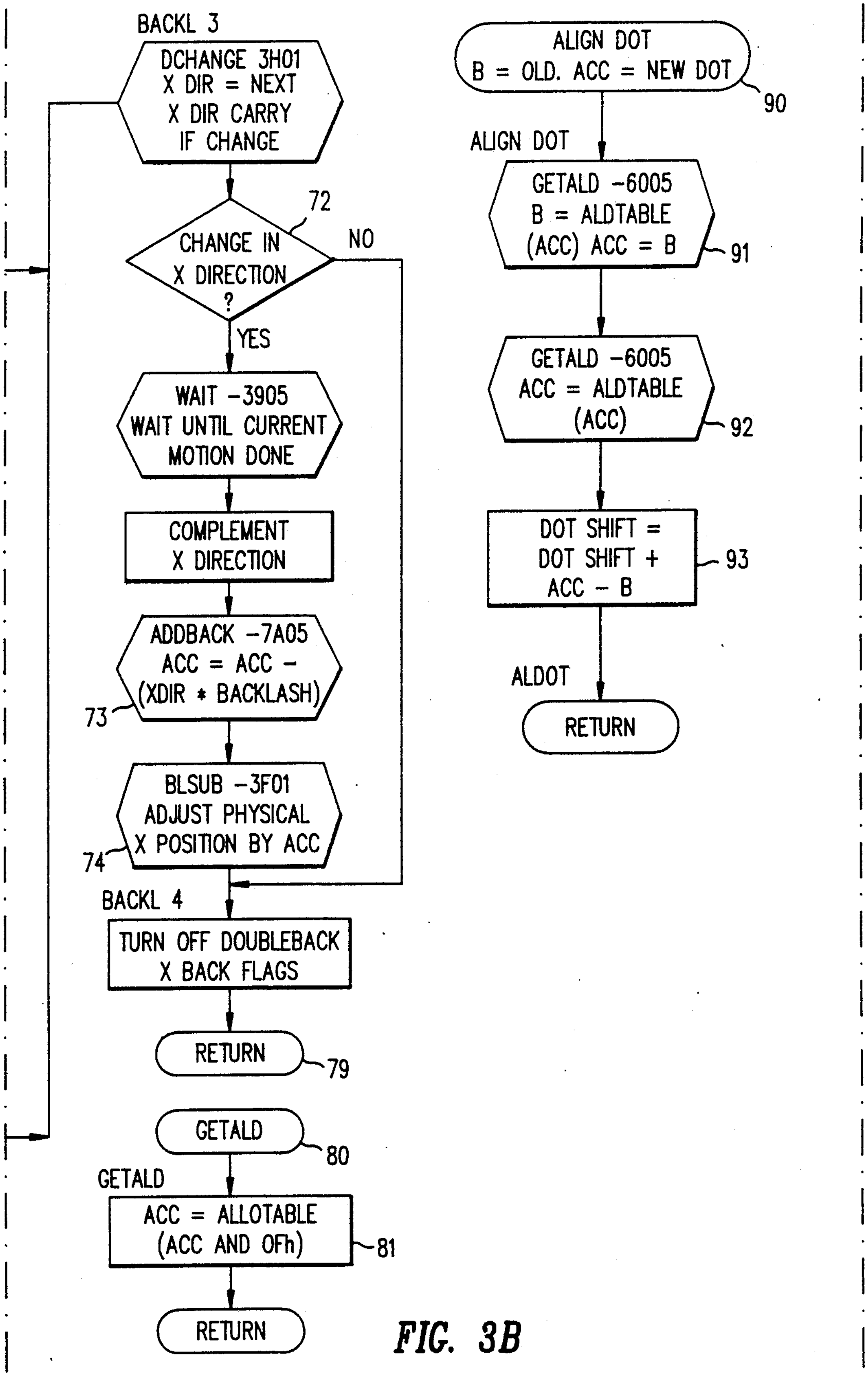
Figure 3C:
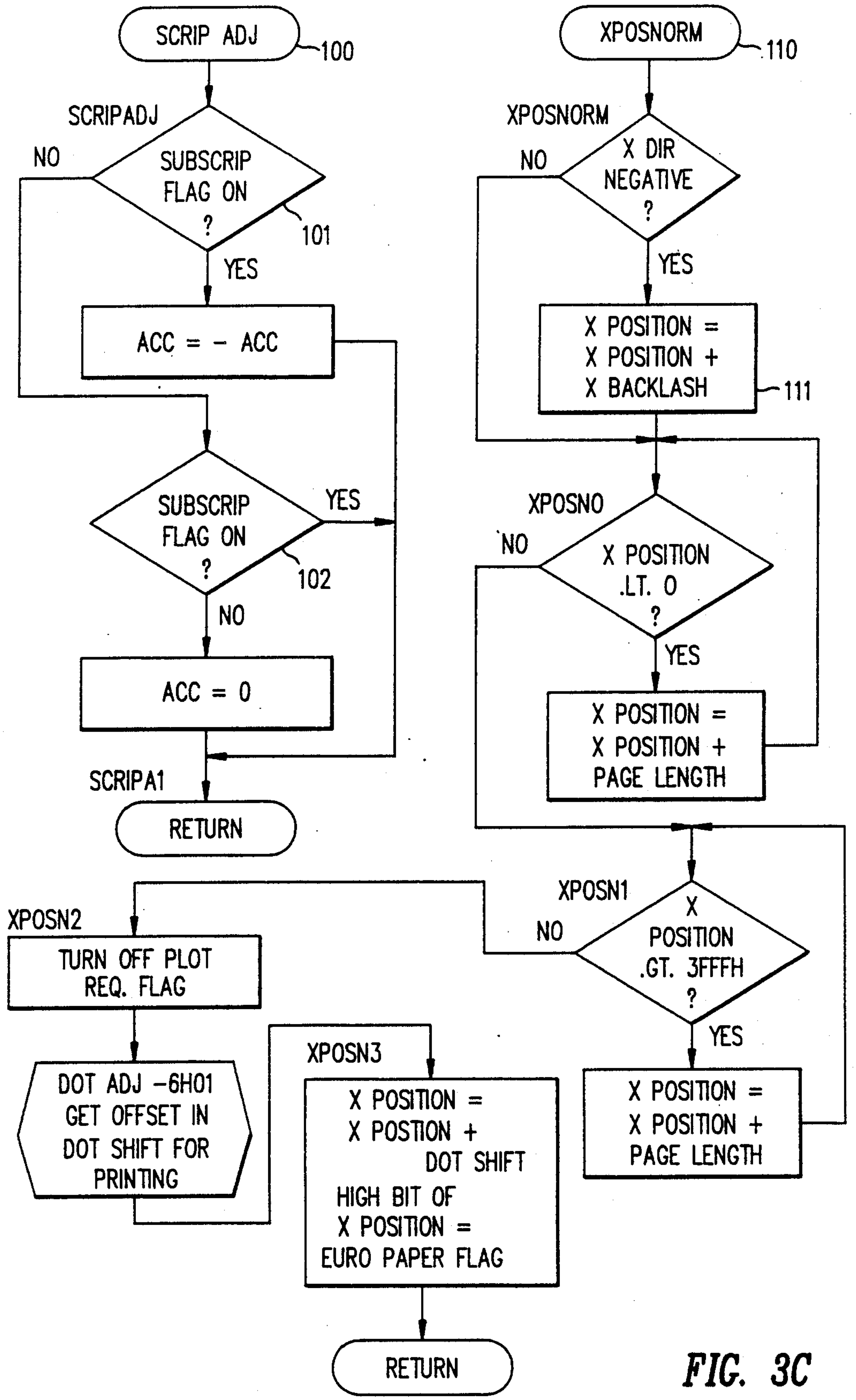
Figure 3D:
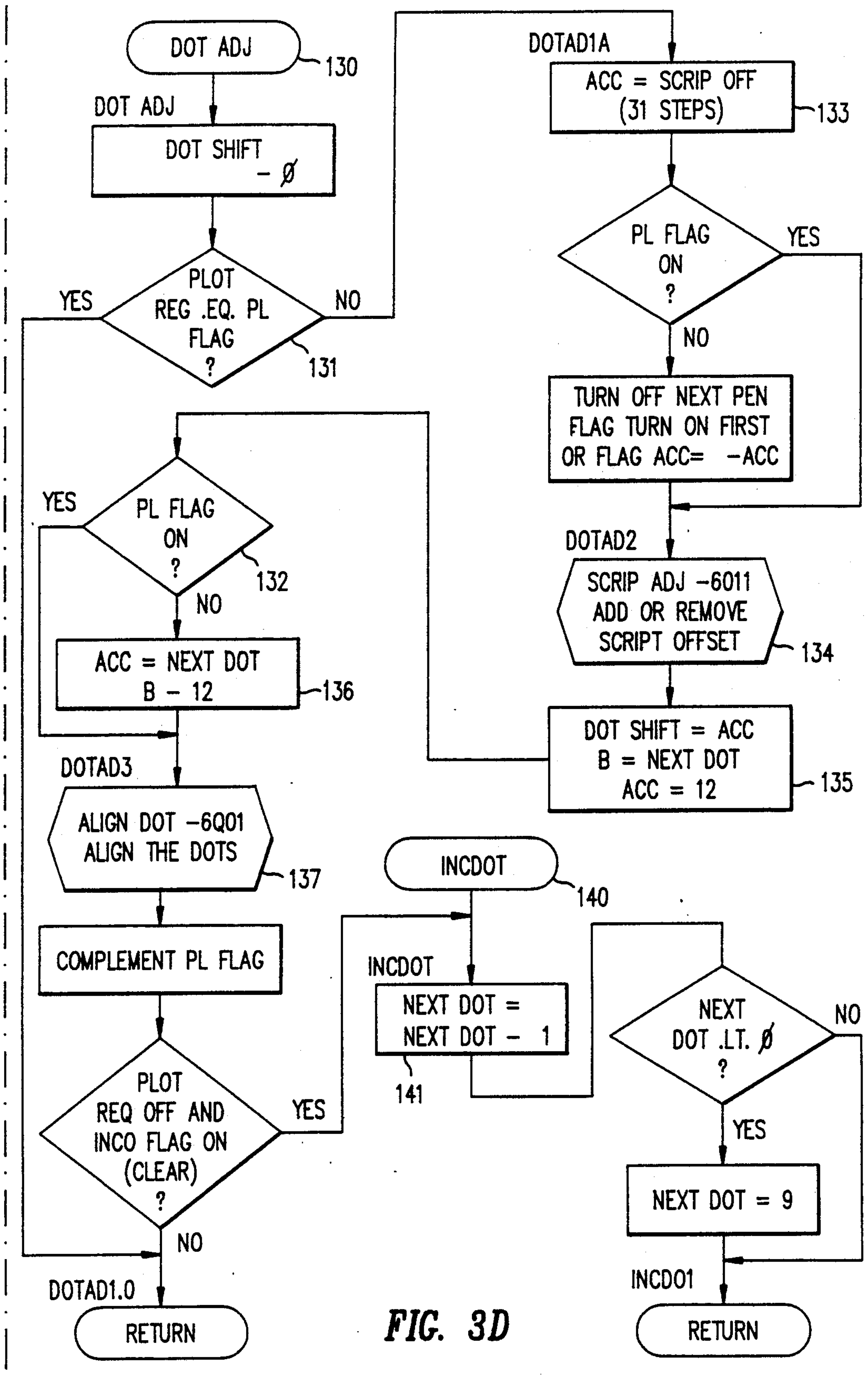

As is conventional, in the flow chart in FIG. 3 the ovals depict the beginning and end of subroutines. The diamonds are decision points. The rectangles are calculations. The hexagons are calling of other subroutines The text inside each shape describes the activity taking place.

Subroutine BACKLASH 60 in FIG. 3 is thus called by the conventional printer-plotter 30 software for each line segment or character to be plotted. (Note that conventionally characters may be "plotted" in plot mode or "printed" in print mode.) The purpose of BACKLASH 60 is to correct the position of medium 31 relative to the jet to be used, and to account for any corrections needed in the vertical (X direction) movement of medium 31 due to change in direction of movement (i.e., moving up and down) of platten 25 or due to rotation (i.e., changing) of ink-jets during transitions between printing and plotting.

DOT_SHIFT is an input variable representing the total motion to be made by platen 35 to correct for ink-jet rotation, so that while plotting with different ink-jets the registration of the plotted line of ink dots in plot mode is maintained with respect to printed text in print mode.

Subroutine BACKLASH checks the value of variable DOT_SHIFT at 61, and if DOT_SHIFT is not equal to zero, then the next X direction is saved at 62. The next X direction is set equal to the sign of DOT_SHIFT at 63. If this is a change in the X direction, then subroutine ADDBACK is called at 70 to add or subtract backlash.

Then subroutine BLSUB 40 is called at 71 to update the X direction and move the platen 35 a distance equal to the value of DOT_SHIFT plus the backlash distance. Then the original next X direction is restored at 79.

If there is a change in X direction at 72, then subroutine ADDBACK is called at 73 to add or subtract backlash. BLSUB 40 is called at 74 to update the X direction and move the platen the backlash direction without changing the position count.

As explained above, subroutine BLSUB 40 is called by the BACKLASH routine at 71 and 74. The purpose of BLSUB 40 is to cause the stepper motor (not shown) which controls platen 35 to move the number of steps in the accumulator (ACC) 41 in direction X without changing the position count at 43.

Subroutine DOT_ADJ 130 is called by the conventional printer-plotter software whenever new data to be plotted is received by microcontroller 32. The purpose of DOT_ADJ 130 is to get the adjustment for dot position (i.e., ink-jet) and script (superscripts and subscripts) into variable DOT_SHIFT. DOT_ADJ determines if the printer-plotter 30 has been requested to be in plot mode at 131 and checks to see if the printer-plotter 30 is currently in plot mode at 132. If the printer-plotter is undergoing a transition between print mode and plot mode, a value is set in the accumulator at 133 to adjust for the printing of superscripts or subscripts. Subroutine SCRIP ADJ 100 is then called at 134.

The purpose of SCRIP ADJ 100 is to get the offset value for variable DOT_SHIFT to adjust for subscript or superscript printing. SCRIP ADJ checks for a subscript flag at 101 and a superscript flag at 102, then returns to subroutine DOT ADJ at 134.

At this point, in DOT ADJ at 135 register B is set equal to the value of variable NEXT DOT, and the accumulator (ACC) is set equal to 12, if a plot to print transition is in effect. If a print to plot transition is in effect, the accumulator is set equal to the value of variable NEXT DOT and register B is set equal to 12 at 136, and then subroutine ALIGN DOT 90 is called at 137.

ALIGN DOT 90 looks up an actual dot count by calling subroutine GETALD 80 at 91 and 92. GETALD 80 looks up at 81 in a table ALDTABLE the dot alignment values for transitions between printing and plotting, based on the number of vertical steps per inch made by the platen 35 in the X direction of movement of medium 31, and on the spacing of the dots per inch as they are printed by printhead 20. A table such as ALDTABLE is used in the preferred embodiment, in place of a calculation of dot alignment, because there is not an integral number of steps in the X-direction (see FIG. 2) taken by the platen 35 between the relative positions with regard to medium 31 of adjacent ink-jets *22a*, *22b*, etc. Therefore a look-up table such as ALDTABLE is provided with pre-calculated dot alignment (i.e., relative spacing) data so as to properly index a particular jet *22a* to the medium 31.

ALIGN DOT 90 thus provides values for register B and for the accumulator ACC at 91, 92 and sets variable DOT SHIFT equal to the previous value of DOT SHIFT plus the total number of steps that have to be moved by the platen to take into account changes in dot position due to transitions between printing and plotting at 93.

Subroutine INCDOT 140 is called by the conventional printer-plotter software when the printer-plotter 30 executes its first carriage return after a period of being in plot mode. (Conventionally, carriage returns are only executed in print mode.) INCDOT 140 at 141 increments the value of NEXT DOT by one, thus telling the printer plotter to plot the next plot (i.e., graph) using the next ink-jet Subroutine XPOSNORM 110 is only called in event of a power failure of printer-plotter 30 or a soft reset of the host system 37. In the event of a power failure, the printer-plotter 30 will send its vertical position on the medium 31 back to the host system 37. In the case of a soft reset, the printer-plotter 30 will save that value. The purpose of XPOSNORM therefore is to ensure that when the printer-plotter 30 is reset that it does not lose track of the vertical index, labelled X POSITION in 111.

The computer program depicted in flowchart format in FIG. 3 is shown in FIGS. 4A to 4E in conventional 8051 microprocessor assembly language complete with explanatory comments on the various subroutines.

This patent disclosure includes material subject to copyright protection. The copyright owner has no objection to the facsimile reproduction of the patent disclosure, as it appears in the Patent and Trademark Office records, but otherwise reserves all copyright rights whatsoever.

The above description of the invention is illustrative and not limiting; further embodiments will be apparent in light of the teachings of the invention.

I claim:

1. A method for using a plotter having a plotting means with a plurality of jets for plotting and a control means for controlling the plotting means, comprising the steps of:

moving the plotting means across a medium repeatedly;

plotting a graph on the medium including a plurality of non-parallel lines; and alternating between two or more jets used for plotting upon completion of plotting of the graph.

2. The method of claim 1, further comprising the step of alternating the jets in a predetermined order.

3. The method of claim 2, wherein the plotting means comprises an ink-jet cartridge having a number N of jets, less than N of which are included in the predetermined order.

4. The method of claim 1, wherein the plotting means comprises an ink-jet cartridge.

5. The method of claim 1, further comprising the step of providing control means for controlling the plotting means comprising a computer program.

6. The method of claim 1, further comprising the step of providing a control means comprising a computer in the plotter.

7. The method of claim 1, wherein the plotter operates in a print mode and a plot mode, further comprising the step of alternating between jets only while the plotter is in the plot mode.

8. The method of claim 1, further comprising the step of providing a pre-calculated relative spacing between the jets so as to index a particular jet to a medium upon which the plotting is performed.

9. The method of claim 1, further comprising the step of saving for a predetermined time a position of the jet used for plotting relative to a medium upon which the plotting is performed.

10. A method of plotting graphic images by ink jets, comprising the steps of:

plotting graphic images including a plurality of lines not parallel to each other; and distributing the task of plotting one or more graphic images over plural ink jets.

11. A plotter comprising:

plotting means having a plurality of jets of plotting;

control means for controlling the plotting means; and means for alternating the jets used for plotting only after plotting a graph including a plurality of lines not parallel to each other.

12. The plotter of claim 11, wherein the plotting means comprises an ink-jet cartridge.

* * * * *